(12) United States Patent
Le Talludec et al.

(10) Patent No.: US 11,478,839 B2
(45) Date of Patent: Oct. 25, 2022

(54) LID FOR A METAL CAN, COMPRISING A METAL RING AND A PEELABLE, HEAT-SEALED MEMBRANE

(71) Applicant: TRIVIUM PACKAGING GROUP NETHERLANDS B.V., Deventer (NL)

(72) Inventors: Alain Le Talludec, Durtal (FR); Bernard Deltour, Crosmieres (FR)

(73) Assignee: TRIVIUM PACKAGING GROUP NETHERLANDS B.V., Deventer (NL)

( * ) Notice: Subject to any disclaimer, the term of this patent is extended or adjusted under 35 U.S.C. 154(b) by 303 days.

(21) Appl. No.: 16/648,864

(22) PCT Filed: Oct. 17, 2018

(86) PCT No.: PCT/EP2018/078457
§ 371 (c)(1),
(2) Date: Mar. 19, 2020

(87) PCT Pub. No.: WO2019/077004
PCT Pub. Date: Apr. 25, 2019

(65) Prior Publication Data
US 2020/0276631 A1 Sep. 3, 2020

(30) Foreign Application Priority Data
Oct. 20, 2017 (FR) ........................ 1759923

(51) Int. Cl.
*B21D 51/44* (2006.01)
*B29C 65/18* (2006.01)
(Continued)

(52) U.S. Cl.
CPC ............ *B21D 51/443* (2013.01); *B29C 65/18* (2013.01); *B29C 65/368* (2013.01);
(Continued)

(58) Field of Classification Search
CPC ...... B21D 51/443; B21D 51/44; B21D 51/38; B65D 17/502; B65D 17/501; B65D 17/50;
(Continued)

(56) References Cited

U.S. PATENT DOCUMENTS 2,343,975 A * 3/1944 Hosfield ............... B29C 66/431
156/305
3,345,798 A * 10/1967 Sternau ................. B65B 7/2885
53/329.2
(Continued)

FOREIGN PATENT DOCUMENTS

EP 0 090 957 A2 10/1983
EP 0 221 842 A1 5/1987
(Continued)

OTHER PUBLICATIONS

International Search Report and Written Opinion, dated Jan. 16, 2019, from corresponding/related International Application No. PCT/EP2018/078457.
(Continued)

*Primary Examiner* — Robert J Hicks
(74) *Attorney, Agent, or Firm* — Nixon & Vanderhye

(57) ABSTRACT

A lid suitable for closing a metal can includes a metal ring onto which a peelable membrane is sealed. An inner annular part of the metal ring is equipped with a roll defining an annular space therebetween. The first connection portion of the roll and the second connection portion of the inner annular part opposite are sealed to one another by element of a heat-sealing material to form a seal sealing the annular space so at to protect the free edge of the roll. The invention also relates to a method for producing such a lid.

20 Claims, 3 Drawing Sheets

Figure 1:
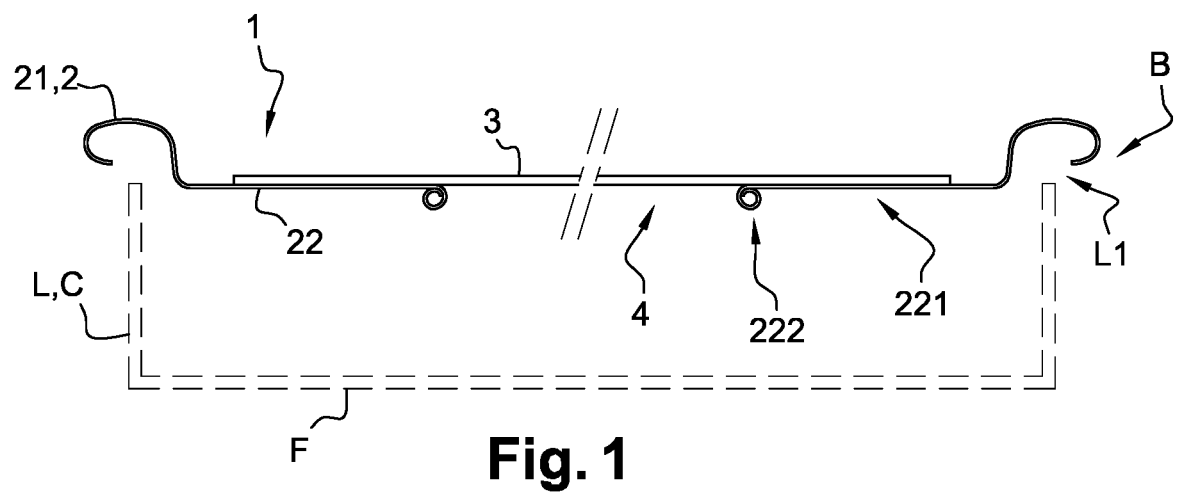

(51) Int. Cl.
*B29C 65/36* (2006.01)
*B29C 65/00* (2006.01)
*B65D 17/50* (2006.01)
*B29L 31/56* (2006.01)
*B29L 31/00* (2006.01)

(52) U.S. Cl.
CPC .... *B29C 65/3656* (2013.01); *B29C 66/24221* (2013.01); *B29C 66/474* (2013.01); *B29C 66/5346* (2013.01); *B29C 66/71* (2013.01); *B29C 66/7234* (2013.01); *B29C 66/72321* (2013.01); *B29C 66/7352* (2013.01); *B29C 66/73921* (2013.01); *B65D 17/502* (2013.01); *B29C 2793/0018* (2013.01); *B29C 2793/0081* (2013.01); *B29L 2031/565* (2013.01); *B29L 2031/717* (2013.01)

(58) Field of Classification Search
CPC ... B29C 65/18; B29C 65/3656; B29C 65/368; B29C 66/24221; B29C 66/474; B29C 66/5346; B29C 66/71; B29C 66/72321; B29C 66/7352; B29C 66/73921
USPC ......... 220/359.3, 359.2, 359.4, 359.1, 257.3, 220/257.1, 256.1; 215/232
See application file for complete search history.

(56) References Cited

U.S. PATENT DOCUMENTS

| | | | |
|---|---|---|---|
| 4,187,137 A | * | 2/1980 | Beauchamp ............. B65D 3/22 229/4.5 |
| 4,540,105 A | | 9/1985 | Wright |
| 4,544,080 A | | 10/1985 | Wright et al. |
| 2005/0145630 A1 | | 7/2005 | Williams et al. |
| 2017/0183121 A1 | | 6/2017 | Gauch et al. |

FOREIGN PATENT DOCUMENTS

| | | | | |
|---|---|---|---|---|
| EP | 0 408 268 A2 | | 1/1991 | |
| EP | 1 595 808 A2 | | 11/2005 | |
| EP | 2 019 045 A1 | | 1/2009 | |
| GB | 1382117 A | * | 1/1975 | ......... B65D 51/1683 |
| JP | 2000062848 A | * | 2/2000 | ............ B65D 77/20 |

OTHER PUBLICATIONS

Third Party Observation, dated Jul. 24, 2019, from corresponding/related International Application No. PCT/EP2018/078457.

* cited by examiner

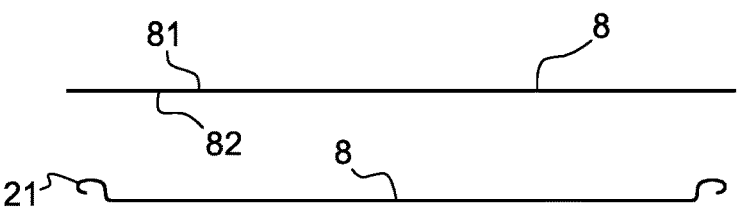
Fig. 4A
Fig. 4B
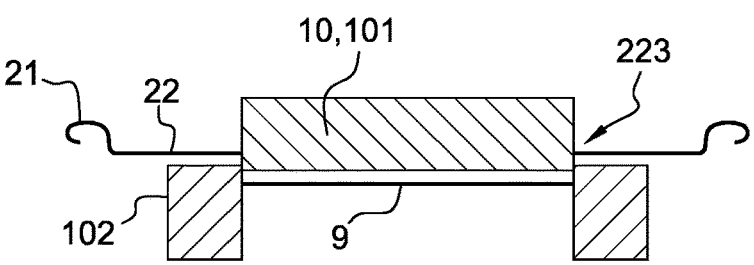
Fig. 4C
Fig. 4D
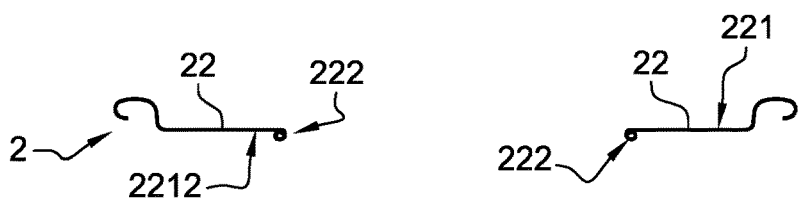
Fig. 4E
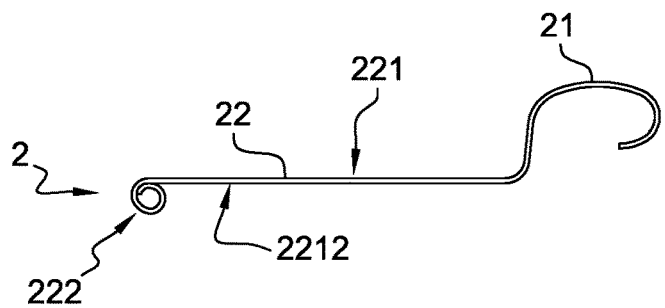
Fig. 4F
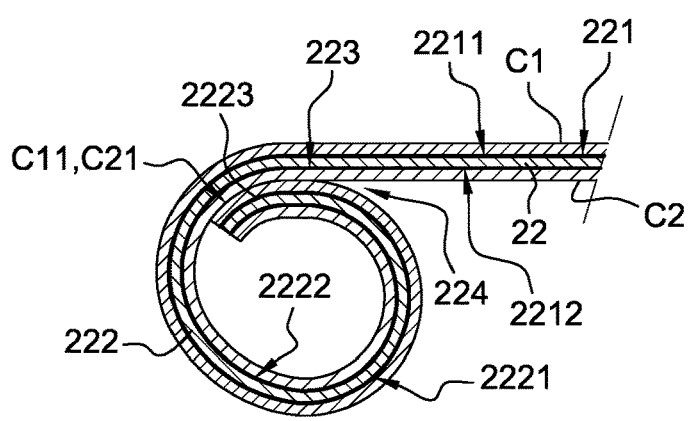
Fig. 4G

LID FOR A METAL CAN, COMPRISING A METAL RING AND A PEELABLE, HEAT-SEALED MEMBRANE

TECHNICAL FIELD TO WHICH THE INVENTION RELATES

The present invention generally relates to the field of lids suitable for closing metal cans. It more particularly relates to lids comprising a metal ring to which a peelable membrane is heat sealed.

TECHNOLOGICAL BACKGROUND

The metal cans are commonly used for the packaging of foodstuffs. Such cans may also be used for the packaging of other industrial products, such as paints for example.

Certain cans comprise a lid formed of a metal ring to which a peelable membrane is sealed by heat sealing. Such a lid structure allows an easy opening, directly by hand, without requiring any tool or accessory.

For that purpose, the metal ring generally comprises two concentric parts:
an outer annular part, adapted to be fastened to an edge of the lateral wall of a can body, and
an inner annular part, to which the peelable membrane is sealed by heat sealing.

The free edge of the inner annular part is often very sharp, with a significant risk of cut injuries for the user handling the can.

To protect and hide this free edge, the inner annular edge of this inner annular part is conventionally shaped as a loop called a "roll". This roll is generally made by rolling of the matter onto itself, towards the outside of the can; and it is directed towards the lower annular face of the inner annular part, on the inner side of the can.

But, in practice, this solution generates a new drawback: the metal ring manufacturing method generates a roll free edge whose metal is not protected; this free edge is then liable to chemically interact with the can content, with potential phenomena of corrosion and/or sulfidation liable to contaminate this content and to make the visual aspect unacceptable due to this contamination, with a dark deposit on the ring and/or on the product.

According to what precedes, there exists a need for a solution suitable for protecting the free edge of the roll in order to avoid the chemical reaction phenomena liable to occur at this free edge of the roll.

OBJECT OF THE INVENTION

In order to remedy the above-mentioned drawback of the state of the art, the present invention proposes a new lid structure whose free edge of the roll is protected against the chemical interactions with the can content (hence avoiding the corrosion and/or sulfidation problems).

More particularly, it is proposed according to the invention a lid suitable for closing a metal can, wherein the lid comprises a metal ring to which a peelable membrane is sealed.

This metal ring comprises:
an outer annular part adapted to be fastened to an edge of the lateral wall of a can body, and
an inner annular part, to which said peelable membrane is sealed,
wherein the inner annular part includes a crown part extended by a roll delimiting a central aperture,
wherein the crown part includes:
an upper annular face to which said peelable membrane is sealed by means of a sealing strip made of a heat-seal material, and
a lower annular face, opposed to said upper annular face,
wherein the roll is formed on the side of the lower annular face of said crown part, and includes an outer surface and an inner surface extending in continuation of the upper and lower annular faces of said crown part, and a free edge arranged within said roll,
wherein the outer surface of said roll includes a first connection portion that is arranged opposite and near a second connection portion of the inner annular part, delimiting an annular space between each other.

And according to the invention, the outer surface and the inner surface of said roll are covered with a heat-seal material,
and said first connection portion and said second connection portion are sealed to each other by means of said heat-seal material to form a sealing gasket closing said annular space.

The roll is hence made tight thanks to the sealing gasket that closes the annular space.

This sealing gasket hence prevents the interactions between the free edge of this roll (not covered with a coating), and the can content.

This solution is hence particularly efficient to avoid the chemical reactions between the free edge of the roll and the environment (in particular the can content).

Such a lid has more over for interest to allow the use of a metal ring whose coating is made on flat metal, and whose roll may be made by rolling in both directions ("inward" or "outward").

Other non-limitative and advantageous characteristics of the lid according to the invention, taken individually or according to all the technically possible combinations, are the following:
the upper annular face and the lower annular face of the crown part, as well as the outer surface and the inner surface of the roll are covered with said heat-seal material,
according to a first embodiment, the roll is formed by a so-called "inward" roll, so that said first connection portion of said roll is opposite said second connection portion of said inner annular part that is arranged in continuation of said lower annular face of the crown part,
the heat-seal material is chosen among polypropylene and polyethylene (for example, in the form of a heat-seal varnish that advantageously consists of a polymer matrix and a polypropylene dispersion).

In a variant embodiment, the roll is formed by a so-called "inward" rolling, so that said first connection portion of said roll is opposite said second connection portion of said inner annular part that is arranged in the continuation of said lower annular face of the crown part.

In a variant embodiment, the roll is formed by a so-called "outward" rolling, so that said first connection portion of said roll is opposite said second connection portion of said inner annular part that is arranged in the continuation of said upper annular face of the crown part.

The invention also proposes a metal can comprising:
a can body having a lateral wall ended by an edge, and
a lid according to the invention, crimped to said edge of said lateral wall.

The invention also proposes a method for manufacturing a lid according to the invention.

The method comprises, in succession:
  a step of providing a metal ring according to the invention, whose annular space is at least partially filled with a heat-seal material and in which the first connection portion of the outer surface of said roll and the second connection portion opposite the inner annular part are not sealed to each other by means of said heat-seal material, and
  a heating step during which, on the one hand, the peelable membrane is heat sealed to said metal ring by means of the sealing strip, and on the other hand, the first connection portion of the roll is sealed to the second connection portion opposite the inner annular part by means of the sealing gasket.

Other non-limitative and advantageously characteristics of the method according to the invention, taken individually or according to all the technically possible combinations, are the following:
  the metal ring provision step comprises, previously to a roll forming operation, a coating operation during which the heat-seal material is deposited on the two annular faces of the crown part; the coating operation is performed by means of a heat-seal varnish or from a metal pre-coated with a heat-seal film;
  during the heating step, the heating is made from an upper surface of the peelable membrane to generate the sealing strip and the sealing gasket, advantageously by means of a phenomenon of heat conduction or induction; the heating step is advantageously implemented by means of a heat-seal tool comprising an upper heating jaw, clamping and heating the opposite upper annular face, including an annular area opposite the roll, to generate the sealing strip and the sealing gasket;
  during the heating step, a clamping force is exerted on a lower portion of the roll so as to flatten the first connection portion of said roll and the second connection portion of the opposite inner annular part against each other; this heating step is advantageously implemented by means of a heat-seal tool (for example, by induction) comprising a lower bearing member, exerting a bearing force against a lower portion of the roll and directed towards the inner annular part.

DETAILED DESCRIPTION OF AN EXEMPLARY EMBODIMENT

The following description with respect to the appended drawings, given by way of non-limitative examples, will permit a good understanding of what the invention consists in and of how it can be implemented.

Figure 2:
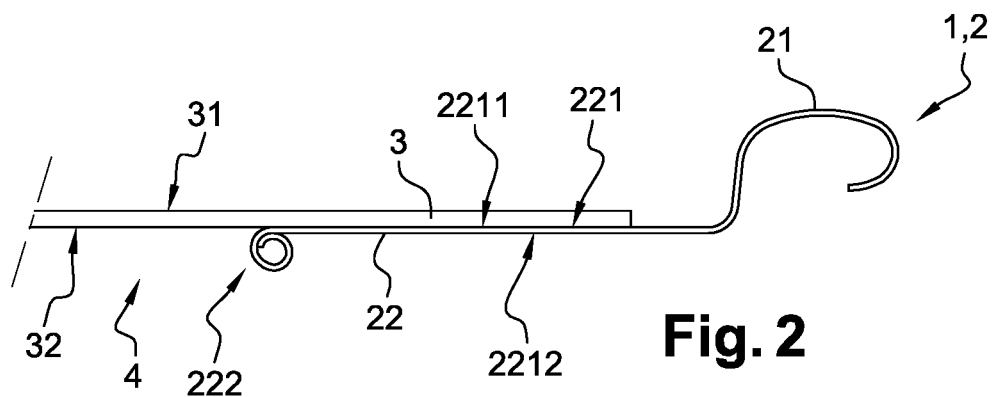
Figure 3:
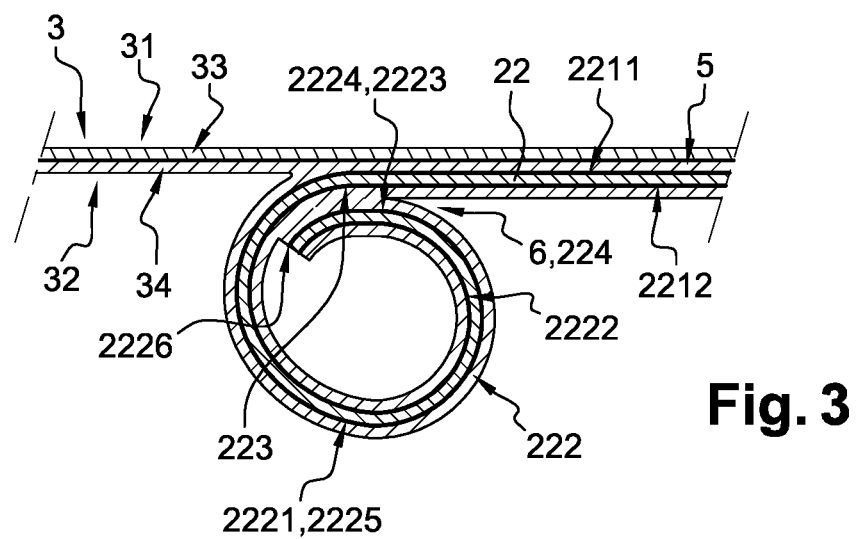
Figure 5A:
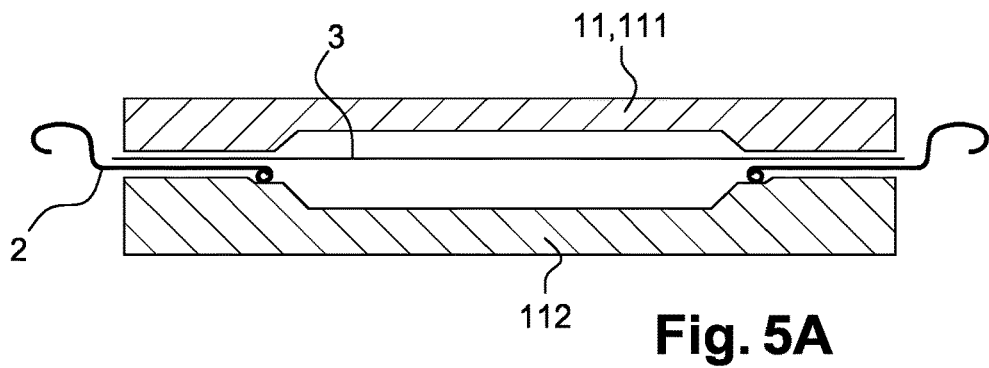
Figure 5B:
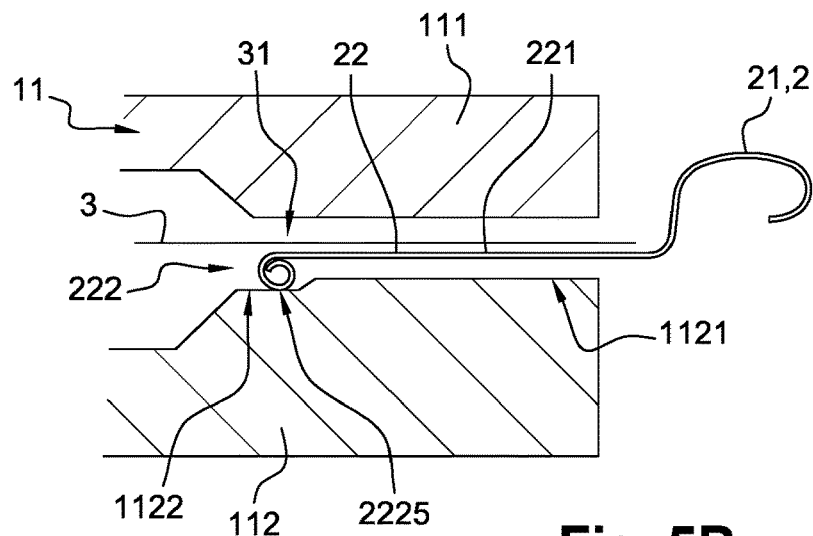
Figure 6:
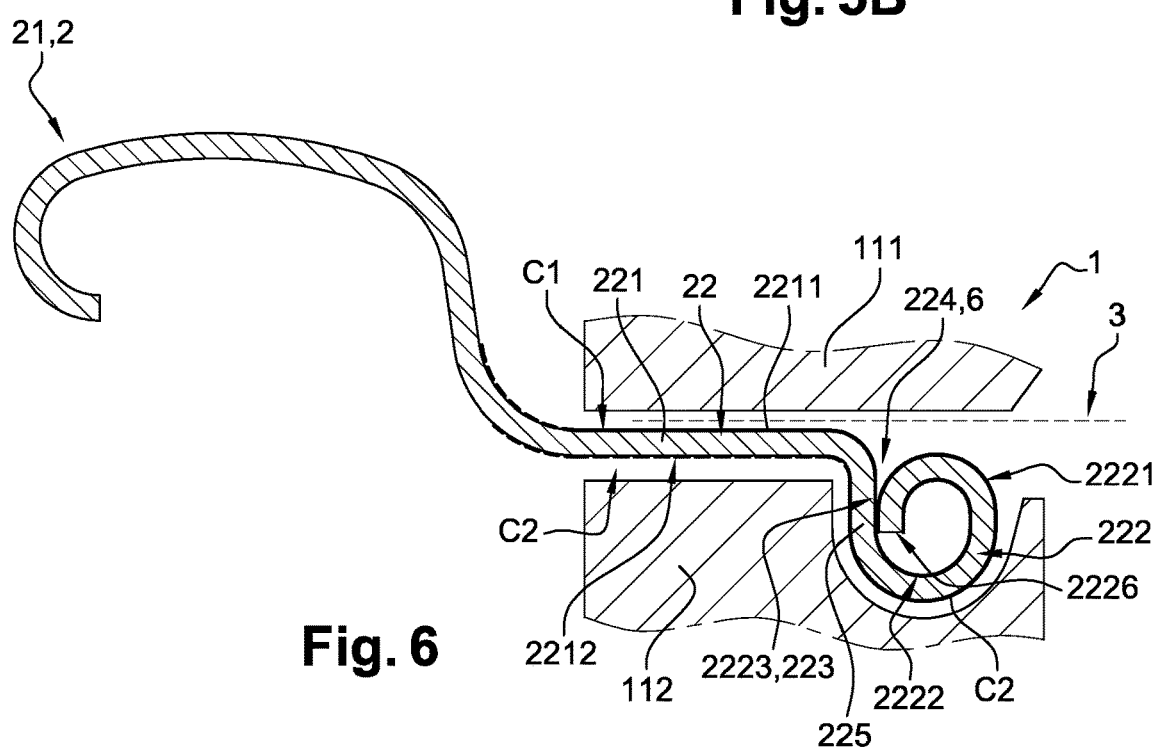

In the appended drawings:
  FIG. 1 is a schematic cross-sectional view of a first embodiment of a lid according to the invention that comprises a metal ring to which a peelable membrane is sealed;
  FIGS. 2 and 3 are partial and enlarged views of the lid according to FIG. 1, showing in detail the seals arranged, on the one hand, between the metal ring and the peelable membrane and, on the other hand, within the metal ring itself, between the roll and inner annular part;
  FIG. 4 (composed of FIGS. 4A to 4G) shows the main operations for manufacturing the metal ring during the lid provision step according to FIGS. 1 to 3;
  FIG. 5 (composed of FIGS. 5A and 5B) shows the heating step during which, on the one hand, the peelable membrane is heat sealed to the metal ring and, on the other hand, the sealing gasket is simultaneously formed within the annular space delimited between the roll and the inner annular part of the metal ring, for obtaining the lid according to FIGS. 1 to 3;
  FIG. 6 is a schematic cross-sectional view of a second embodiment of a lid according to the invention, whose roll is of the outward type.

LID AND METAL CAN

FIGS. 1 to 3 show a lid 1 that is suitable to be added on a can body C to form a metal can B (for example, a so-called "two-piece" can).

A can body C is schematically shown, in broken lines, in FIG. 1.

This can body C advantageously consists of a single-piece metal body, comprising a lateral wall L and a bottom F.

Generally, the lid 1 according to the invention comprises a metal ring 2 to which the peelable membrane 3 is sealed.

Peelable Membrane

The peelable membrane 3 is advantageously chosen among the peelable membranes 3 conventional per se.

This peelable membrane 3 has two opposite surfaces:
  an upper surface 31, intended to be directed towards the outside of the can B,
  a lower surface 32, intended to be directed towards the inside of the can B and designed to be sealed to the metal ring 2.

Traditionally, the peelable membrane 3 comprises several layers (FIG. 3);
  an upper, base layer 33, also called "barrier layer", made of a resistant and flexible material, for example aluminium, and
  a lower, sealing layer 34, adapted in particular to realize the sealing to the metal ring 2.

The sealing layer 34 may be composed of different sub-layers (not shown), i.e.:
  an adhesive sub-layer, made for example of maleic anhydride grafted polypropylene and having a thickness of 2 to 15 micrometers,
  a peeling sub-layer, made for example of a mixture of polyethylene and polypropylene, having a thickness of 15 to 80 micrometers, and
  an outer sealing sub-layer, made for example of polypropylene, having a thickness of 2 to 15 micrometers.

To facilitate the peeling thereof, this peelable membrane 3 may also include a grasp or pull tab (not shown), intended to facilitate the separation of the peelable membrane 3 from the metal ring 2 by the consumer.

Metal Ring

The metal ring 2 is made, for example, of steel or aluminium.

This metal ring 2 comprises two main concentric parts:
  an outer annular part 21, adapted to be fastened to a free edge L1 of the lateral wall L of the can body C, for example by crimping, and
  an inner annular part 22, on which the peelable membrane 3 is sealed by heat sealing.

The inner annular part 22 is described in more details hereinafter in relation with FIGS. 2 and 3.

This inner annular part 22 includes a crown part 221 extended by a roll 222 delimiting a central aperture 4 closed by the added peelable membrane 3.

The crown part 222 includes:
  an upper annular face 2211, intended to be directed towards the outside of the can and to which the peelable membrane 3 is sealed, and a lower annular face 2212, intended to be directed towards the inside of the can and opposed to the upper annular face 2211.

The roll 222 is formed on the side of the lower annular face 2212 of the crown part 221 of the inner annular part 22.

By "on the side of the lower annular face 2212", it is advantageously meant a roll 222 arranged on the same side as the lower annular face 2212, considering a general plane passing through the crown part 221.

This roll 222 has advantageously the general shape of a spiral, formed over at least one turn or coil (for example, between 1 and 1.5 turn/coil); it is herein formed by a so-called "inward" rolling, i.e. directed towards the inside of the can (considering a general plane passing through the crown part 221).

The roll 222 also includes two opposite surfaces:
- an outer surface 2221, extending in the continuation of the upper annular face 2211 of the crown part 221 of the inner annular part 22,
- an inner surface 2222, extending in the continuation of the lower annular face 2212 of the crown part 221 of the inner annular part 22.

The outer surface 2221 of the roll 222 includes a first connection portion 2223 that is arranged opposite and near a second connection portion 223 of the inner annular part 22, delimiting an annular space 224 between each other.

The second connection portion 223 in question of the inner annular part 22 is herein formed by an inner strip of the lower annular face 2212 of the crown part 221.

The annular space 224 has for example a thickness comprised between 1 and 100 μm.

The roll 222 also includes:
- an upper portion 2224, arranged opposite the annular face 2212 of the inner annular part 22, at which is herein arranged said annular space 224, herein forming the first connection portion 2223,
- a lower portion 2225, diametrically opposed to said upper portion 2224, and
- a free edge 2226, arranged in its interior, within the roll 222.

Heat-Seal Material

A heat-seal material is herein distributed over the two annular faces 2211, 2212 of the crown part 221 of the inner annular part 22, as well as over the outer 2221 and inner 2222 surfaces of the roll 222 (this heat-seal material is very schematically shown in FIG. 3).

By "heat-seal material", it is meant a material adapted to be activated to fulfil a sealing (or bonding) function when subjected to a heating (for example, a local heating by conduction or induction).

This heat-seal material is for example chosen among polypropylene or polyethylene (for example, in the form of a heat-seal varnish that advantageously consists of a polymer matrix and a polypropylene dispersion).

Herein, this heat-seal material covers at least one portion of the two annular faces 2211, 2212 of the crown part 221 of the inner annular part 22 and the outer 2221 and inner 2222 surfaces of the roll 222.

This heat-seal material hence forms two sealing areas (or, in other words, "bonding areas"):
- a first sealing area is defined by a sealing strip 5 arranged between the upper annular face 2211 of the crown part 221 of the inner annular part 22 and the lower surface 32 of the peelable membrane 3, and
- a second sealing area is defined by a sealing gasket 6 arranged between the first connection portion 2223 of the outer surface 2221 of the roll 222 and the second connection portion 223 opposite the inner annular part 22, to close the annular space 224.

The sealing gasket 6, formed by the heat-seal material, extends continuously (and over the whole circumference) between the first connection portion 2223 of the roll 222 and the second connection portion 223 opposite the inner annular part 22.

This sealing gasket 6 hence prevents the exchanges between the inside of the roll 222 (where its free edge 2226 is located) and the ambient environment, through the annular space 224.

In particular, this sealing gasket 6 is intended to prevent the packaged product from entering the roll 222, so as to avoid the chemical reactions of the free edge 2226 thereof with the packaged product (for example, corrosion and/or sulfidation).

Moreover, the heat-seal material may also cover all or part of the metal ring 2 outside the sealing gaskets 5, 6, i.e. in particular the lower annular face 2212 of the crown part 221 of the inner annular part 22.

Can

Once prepared, the lid 1 may be fastened to the lateral wall L of the can body C, after the filling of this can body C (for example, with foodstuffs).

This fastening may be made using a traditional crimping operation between the outer annular part 21 of the metal ring 2 and the free edge L1 of the lateral wall L of the can body C.

Hence, a closed metal can B is obtained, which comprises:
- a can body C including a lateral wall L ended by an edge L1, and
- the lid 1, crimped to the edge L1 of this lateral wall L.

Lid Manufacturing Method

The lid 1 according to the invention may be obtained using a manufacturing method as described hereinafter in relation with FIGS. 4 and 5.

Generally, this method comprises two successive steps:
- a step of providing the metal ring 2, whose annular space 224 is at least partially filled with the heat-seal material, and wherein the first connection portion 2223 of the roll 222 and the second connection portion 223 opposite the inner annular part 22 are not heat sealed to each other by means of this heat-seal material (FIG. 4), then
- a heating step, during which, on the one hand, the peelable membrane 3 is heat sealed to the metal ring 2 by means of the sealing strip 5 and, on the other hand, the first connection portion 2223 of the roll 222 (herein, its upper portion 2224) is heat sealed to the second connection portion 223 opposite the inner annular part 22 by means of the sealing gasket 6 (FIG. 5).

Provision Step

The provision step advantageously comprises operations for manufacturing the metal ring 2, independently of the peelable membrane 3 and before the assembly thereof.

The step of providing the metal ring 2 comprises, previously to an operation of forming the roll 222, a coating step during which the heat-seal material is deposited on the annular faces of the inner annular part 22, i.e., at least:
- over a portion of the upper annular face 2211 of the crown part 221, of preferably over the entirety of the upper and lower annular faces 2211, 2212 of the crown part 221,
- over said connection portions 2223 and 223, and
- over the outer and inner surfaces 2221, 2222 of the roll 222.

This step of providing the metal ring 2 advantageously comprises the following operations:
- an operation of providing a metal plate (not shown),
- an operation of cutting a blank 8 in said metal plate (FIG. 4A),
- an operation of drawing the blank 8 to form the outer annular part 21 (FIGS. 4A to 4B),
- a step of cutting a central disk 9 within the blank 8, by means of a cutting tool 10 (comprising an upper cutting tool 101 and a lower cutting tool 102), to form the inner annular part 22 (FIG. 4C) with the crown part 221,
- an operation of forming the inner annular edge of the inner annular part 22, to form a wall directed towards the lower annular face 2212 of the crown part 221 (to initiate the formation of the roll 222—FIG. 4D),
- an operation of forming the wall, to form the roll 222 opposite its lower annular face 2212 (FIG. 4E to FIG. 4G).

Previously to the operation of forming the roll 222, an operation of coating with the heat-seal material is advantageously implemented. Preferably, this operation is performed on flat metal before any shaping, as explained hereinafter.

This coating operation advantageously consists in depositing the heat-seal material on the metal part intended to form the metal ring 2 (plate, blank, etc.), on two opposite faces 81, 82 intended to form the two annular faces 2211, 2212 of the crown part 221 of the inner annular part 22 and the outer 2221 and inner 2222 surfaces of the roll 222.

This coating operation may be performed:
- by means of a heat-seal varnish (advantageously containing polypropylene), deposited on the metal part (for example, by spraying), or
- from a metal pre-coated with a heat-seal film (containing polypropylene).

The heat-seal varnish may be applied as a full-solid coating, before the shaping of the metal ring 2 (advantageously directly on the metal plate or on the blank 8), or locally as a selective varnishing ("spot coating"), or even by spraying.

The heat-seal varnish advantageously consists of a polymer matrix and a polypropylene dispersion.

Before the formation of the roll 222, the metal ring 2 herein includes two layers C1, C2 of the heat-seal material:
- an upper layer C1, covering the upper annular face of the inner annular part 22, and
- a lower layer C2, covering the lower annular face of the inner annular part 22.

During the formation of the roll 222, the two layers C1, C2 of the heat-seal material are brought opposite to each other at the annular space 224 (FIG. 4G).

At the end of the provision step (FIG. 4G), the metal ring 2 hence still have two layers C1, C2 of the heat-seal material:
- an upper layer C1, covering the upper annular face 2211 of the crown part 221 of the inner annular part 22 and the outer surface 2221 of the roll 222, and
- a lower layer C2, covering the lower annular face 2212 of the crown part 221 of the inner annular part 22 and the inner surface 2222 of the roll 222.

At this roll 222, the first connection portion 2223 (herein at its upper portion 2224) is arranged opposite the second connection portion 223 of the inner annular part 22, delimiting the annular space 224 between each other.

This annular space 224 is at least partially filled with the heat-seal material.

Herein, this filling is made by two separate layer portions:
- a first portion C11 of the upper layer C1, covering the first connection portion 2223 of the roll 222, and
- a second portion C21 of the lower layer C2, opposite said first portion C11, covering the second connection portion 223 of the inner annular part 22 (located on the lower annular face 2212 of the crown part 221 or on the beginning of the inner surface 2222 of the roll 222).

As is, the two portions C11, C21 are opposite to each other (or even adjacent or in contact) within the annular space 224, while remaining separated from each other.

The first connection portion 2223 of the roll 222 and the second connection portion 223 opposite the inner annular part 22 are hence not heat-sealed to each other by means of this heat-seal material.

The heating step will be described in more details hereinafter in relation with FIG. 5.

Herein, from this metal ring 2, the sealings of the peelable membrane 3 and of the annual space 224 are made thanks to the heat-seal material suitably distributed over the metal ring, which is activated by combined actions of heat and pressure.

This heat-seal is advantageously made by means of a heat-seal tool 11, for example a heat-seal jaw that, once the metal ring 2 and the peelable membrane 3 correctly arranged with respect to each other, applies a pressure and a heating.

The heating is advantageously made from the upper surface 31 of the peelable membrane 3, to generate the sealing strip 5 and the sealing gasket 6 by means of a phenomenon of heat conduction or induction.

This heating step is herein implemented by means of a heat-sealing tool 11, for example by induction, comprising two clamping members (or "jaws"), each made of one or several portions:
- an upper heating jaw 111, and
- a lower jaw 112 (preferably also a heating jaw), to provide a counter-pressure.

Herein, the upper jaw 111 is adapted to exert a pressure on the peelable membrane 3, towards the upper annular face 2211 of the crown part 221 of the inner annular part 22, including on the inner annular area located opposite the roll 222.

The lower jaw 112 includes an active surface composed of two clamping portions:
- an outer clamping portion 1121, which exerts a clamping force against the lower annular face 2212 of the crown part 221 of the inner annular part 22, and
- an inner clamping portion 1122, vertically offset, which exerts a clamping force against the lower portion 2225 of the roll 222, this clamping force being also directed towards the crown part 221.

In practice, the pressure and heating exerted by the upper 111 and lower 112 jaws allow a heating that is adapted to generate, at the same time, the sealing strip 5 and the sealing gasket 6.

Indeed, the heat coming from the two jaws 111 and 112 diffuses through the peelable membrane 3 and the inner annular part 22 of the metal ring 2, so as to cause the sealing of the two portions C11, C21 opposite the heat-seal material present within the annular space 224.

In particular, these two opposite portions C11, C21 of the heat-seal material are fused together to form the sealing gasket 6.

The first connection portion 2223 of the roll 222 and the second connection portion 223 opposite the lower annular part 22 are hence sealed to each other by means of the sealing gasket 6 that closes the annular space 224 (FIG. 3).

During this heat sealing, the clamping exerted by the lower jaw 112 (and in particular the inner clamping portion 1122) allows the upper portion 2224 of the roll 222 to be flatten (or at least moved closer to) against (towards) the lower annular face 2212 of the crown part 221 of the inner annular part 22.

This phenomenon contributes to reduce the width of the annular space 224, and it allows bringing the heat-seal materials into intimate contact with each other, in order to obtain an efficient sealing gasket.

The so-obtained lid 1 may then be assembled to the can body C, using an assembling procedure conventional per se (for example, by crimping).

Variant Embodiment

FIG. 6 is a schematic cross-sectional view of a second embodiment of the lid according to the invention.

In this FIG. 6, the structural parts that are identical or similar to those of the previously described embodiment keep the same references to facilitate the understanding.

In FIG. 6, we find the metal ring 2, which comprises:
an outer annular part 21, adapted to be fastened to a free edge of the lateral wall of the can body, for example by crimping, and
an inner annular part 22, to which the peelable membrane 3 is sealed by heat-sealing.

In this variant embodiment, the roll 222 is formed by a so-called "outward" rolling (i.e. rolled towards the outside of the can).

In this case, the roll 222 includes:
an outer surface 2221 extending in the continuation of the lower annular face 2212 of the crown part 221,
an inner surface 2222 extending in the continuation of the upper annular face 2211 of the crown part 221, and
a free edge 2226 arranged within said roll 222.

Still in this case, the first connection portion 2223 of the roll 222 comes opposite the second connection portion 223 of the inner annular part 22 that is herein arranged in the continuation of the upper annular face 2211 of the crown part 221.

The first connection portion 2223 of the roll 222 is herein arranged on the outer side of said roll 222.

And the second connection portion 223 of said inner annular part 22 is herein formed by a wall 225 (or skirt) directed towards the lower annular face 2212 of the crown part 221.

Still in this case, the outer surface 2221 of the roll 222 (in particular, is upper portion) advantageously extends remote from the opposite peelable membrane 3 (FIG. 6). Hence, there is herein advantageously no heat sealing between the roll 222 and the peelable membrane 3.

For that purpose, the height of the second connection portion 223 of said inner annular part 22 (herein the wall 225) is advantageously greater than the height of the roll 222.

We can also see:
an upper layer C1 of the heat-seal material covering the upper annular face 2211 of the crown part 221 of the inner annular part 22 and the inner surface 2222 of the roll 222, and
a lower layer C2, covering the lower annular face 2212 of the crown part 221 of the inner annular part 22 and the outer surface 2221 of the roll 222.

We can also see the first connection portion 2223 of the roll 222 and the opposite second connection portion 223 of the inner annular part 22, which are sealed to each other by means of a heat-seal material, to form a sealing gasket 6 closing the annular space 224.

Here again, in this variant embodiment, the upper annular face 2211 of the crown part 221, and the surfaces 2221, 2222 of the roll 222, are covered with the heat-seal material.

Except the direction of the roll 222, such a lid variant may be obtained according to a manufacturing method identical (or similar) to that described hereinabove in relation with FIGS. 1 to 5.

As illustrated in FIG. 6, the upper 111 and lower 112 jaws are shaped so as to obtain an optimum flattening of the different surfaces to be heat sealed against each other.

Moreover, the lower jaw 112 is advantageously adapted to heat two areas of the metal ring 2, i.e.:
the inner annular part 22 (in particular its crown part 221), to provide the sealing of the peelable membrane 3 by heat sealing, and
the outer surface 2221 of the roll 222, so that the two opposite layers C1, C2 of the heat-seal material are fused together to form the sealing gasket 6.

Here again, this sealing gasket 6 hence prevents the exchanges between the inside of the roll 222 (wherein its free edge 2226 is located) and the ambient environment, through the annular space 224.

In particular, here again, this sealing gasket 6 is intended to prevent the packaged product from entering the roll 222, so as to avoid the chemical reactions of its free edge 2226 with this packaged product (for example, corrosion and/or sulfidation).

The invention claimed is:

1. A lid suitable for closing a metal can, wherein the lid comprises a metal ring (2) to which a peelable membrane (3) is sealed,
wherein the metal ring (2) comprises:
an outer annular part (21) adapted to be fastened to an edge of a lateral wall of a can body, and
an inner annular part (22), to which said peelable membrane (3) is sealed,
wherein the inner annular part (22) includes a crown part (221) extended by a roll (222) delimiting a central aperture (4),
wherein the crown part (221) includes:
an upper annular face (2211) to which said peelable membrane (3) is sealed by means of a sealing strip (5) made of a heat-seal material, and
a lower annular face (2212), opposed to said upper annular face (2211),
wherein the roll (222) is formed on the side of the lower annular face (2212) of said crown part (221),
wherein the roll (222) includes:
an outer surface (2221) and an inner surface (2222) extending in continuation of the upper (2211) and lower (2212) annular faces of said crown part (221), and
a free edge (2226) arranged within said roll (222),
wherein the outer surface (2221) of said roll (222) includes a first connection portion (2223) that is arranged opposite and near a second connection portion (223) of said inner annular part (22), delimiting an annular space (224) between each other,
wherein the outer surface (2221) and the inner surface (2222) of said roll (222) are covered with a heat-seal material,
and wherein said first connection portion (2223) and said second connection portion (223) are sealed to each other by means of said heat-seal material, to form a sealing gasket (6) closing said annular space (224).

2. The lid according to claim 1, wherein the upper annular face (2211) and the lower annular face (2212) of the crown part (221), as well as the outer surface (2221) and inner surface (2222) of the roll (222), are covered with said heat-seal material.

3. The lid according to claim 2, wherein the roll (222) is formed by an inward rolling, so that said first connection portion (2223) of said roll (222) is opposite said second connection portion (223) of said inner annular part (22) that is arranged in the continuation of said lower annular face (2212) of the crown part (221).

4. The lid according to claim 2, wherein the roll (222) is formed by an outward rolling, so that said first connection portion (2223) of said roll (222) is opposite said second connection portion (223) of said inner annular part (22) that is arranged in the continuation of said upper annular face (2211) of the crown part (221).

5. The lid according to claim 2, wherein the heat-seal material is chosen between polypropylene and polyethylene.

6. A metal can, comprising:
a can body (C) including a lateral wall (L) ended by an edge (L1), and
the lid (1) according to claim 2, crimped to said edge (L1) of said lateral wall (L).

7. The lid according to claim 1, wherein the roll (222) is formed by an inward rolling, so that said first connection portion (2223) of said roll (222) is opposite said second connection portion (223) of said inner annular part (22) that is arranged in the continuation of said lower annular face (2212) of the crown part (221).

8. The lid according to claim 7, wherein the heat-seal material is chosen between polypropylene and polyethylene.

9. A metal can, comprising:
a can body (C) including a lateral wall (L) ended by an edge (L1), and
the lid (1) according to claim 7, crimped to said edge (L1) of said lateral wall (L).

10. The lid according to claim 1, wherein the roll (222) is formed by an outward rolling, so that said first connection portion (2223) of said roll (222) is opposite said second connection portion (223) of said inner annular part (22) that is arranged in the continuation of said upper annular face (2211) of the crown part (221).

11. The lid according to claim 10, wherein the heat-seal material is chosen between polypropylene and polyethylene.

12. The lid according to claim 1, wherein the heat-seal material is chosen between polypropylene and polyethylene.

13. A metal can, comprising:
a can body (C) including a lateral wall (L) ended by an edge (L1), and
the lid (1) according to claim 1, crimped to said edge (L1) of said lateral wall (L).

14. A method for manufacturing the lid (1) according to claim 1, comprising in succession:
a) a step of providing the metal ring (2),
wherein the metal ring (2) comprises:
the outer annular part (21) adapted to be fastened to an edge of the lateral wall of a can, and
the inner annular part (22), to which said peelable membrane (3) is intended to be sealed,
wherein said inner annular part (22) includes the crown part (221) extended by the roll (222) delimiting a central aperture (4),
wherein said crown part (221) includes:
the upper annular face (2211) to which said peelable membrane (3) is intended to be sealed by means of a sealing strip (5) made of a heat-seal material, and
the lower annular face (2212), opposed to said upper annular face (2211),
wherein said roll (222) is formed on the side of the lower annular face (2212) of said crown part (221),
wherein said roll (222) includes:
the outer surface (2221) and the inner surface (2222) extending in the continuation of the upper (2211) and lower (2212) annular faces of said crown part (221), and
the free edge (2226) arranged within said roll (222),
wherein said outer surface (2221) of said roll (222) includes a first connection portion (2223) that is arranged opposite and near a second connection portion (223) of said inner annular part (22), delimiting an annular space (224) between each other,
wherein said annular space (224) is at least partially filled with a heat-seal material and wherein the first connection portion (2223) of said roll (222) and the second connection portion (223) opposite the inner annular part (22) being not sealed to each other by means of said heat-seal material, and
b) a heating step during which the peelable membrane (3) is heat sealed to said metal ring (2) by means of the sealing strip (5), and the first connection portion (2223) of the roll (222) is sealed to the second connection portion (223) opposite the inner annular part (22) by means of the sealing gasket (6).

15. The method according to claim 14, wherein the step of providing the metal ring (2) comprises, previously to a step of forming the roll (222), a coating operation during which the heat-seal material is deposited on the metal ring (2).

16. The method according to claim 15, wherein the coating operation is performed by means of a heat-seal varnish or from a metal pre-coated with a heat-seal film.

17. The method according to claim 14, wherein, during the heating step, the heating is performed from an upper surface (31) of the peelable membrane (3) to generate the sealing strip (5) and the sealing gasket (6).

18. The method according to claim 17, wherein the heating step is implemented by means of a heat-seal tool (11) comprising an upper heating jaw (111), clamping and heating the opposite upper annular face (2211), including an opposite annular area of the roll (222), to generate the sealing strip (5) and the sealing gasket (6).

19. The method according to claim 14, wherein, during the heating step, and in the case of an inward rolling, a clamping force is exerted on a lower portion (2225) of the roll (222) so as to flatten the first connection portion (2223) of said roll (222) and the second connection portion (223) of the opposite inner annular part (22) against each other.

20. The method according to claim 19, wherein the heating step is implemented by means of a heat-seal tool (11) comprising a lower clamping member (112), exerting a clamping force against a lower portion (2225) of the roll (222) and directed towards the inner annular part (22).

* * * * *